United States Patent [19]
Soper

[11] Patent Number: 6,156,358
[45] Date of Patent: Dec. 5, 2000

[54] CONTROL OF FOOD PATTY MOLDING MACHINE

[75] Inventor: James L. Soper, Manitowoc, Wis.

[73] Assignee: Progressive Technology of Wisconsin, Inc., Manitowoc, Wis.

[21] Appl. No.: 09/436,152

[22] Filed: Nov. 9, 1999

Related U.S. Application Data

[63] Continuation-in-part of application No. 09/047,070, Mar. 24, 1998, Pat. No. 5,980,228.

[51] Int. Cl.[7] .................................. A22C 7/00; A23P 1/00
[52] U.S. Cl. .............................. 426/231; 99/353; 99/426; 264/40.7; 425/145; 425/449; 425/562; 426/513
[58] Field of Search ..................... 426/231, 512, 426/513; 99/353, 426; 425/145, 449, 562; 264/40.7

[56] References Cited

U.S. PATENT DOCUMENTS

| | | | |
|---|---|---|---|
| 3,887,964 | 6/1975 | Richards | 452/174 |
| 4,356,595 | 11/1982 | Sandberg et al. | 426/513 |
| 5,655,436 | 8/1997 | Soper | 99/353 |
| 5,730,650 | 3/1998 | Soper | 425/562 |
| 5,741,457 | 4/1998 | Iida | 425/145 |
| 5,980,228 | 11/1999 | Soper | 425/145 |

*Primary Examiner*—George C. Yeung
*Attorney, Agent, or Firm*—Andrus, Sceales, Starke & Sawall

[57] ABSTRACT

A food product molding machine of the type utilizing a hydraulically driven feed ram to move food product into the cavities of a reciprocating mold plate includes a ram speed control system operated with a pump supplemented by variable flow control from an accumulator. The system also includes a feed ram pressure release feature at the end of each mold plate fill cycle to reduce component wear and improve product quality.

15 Claims, 6 Drawing Sheets

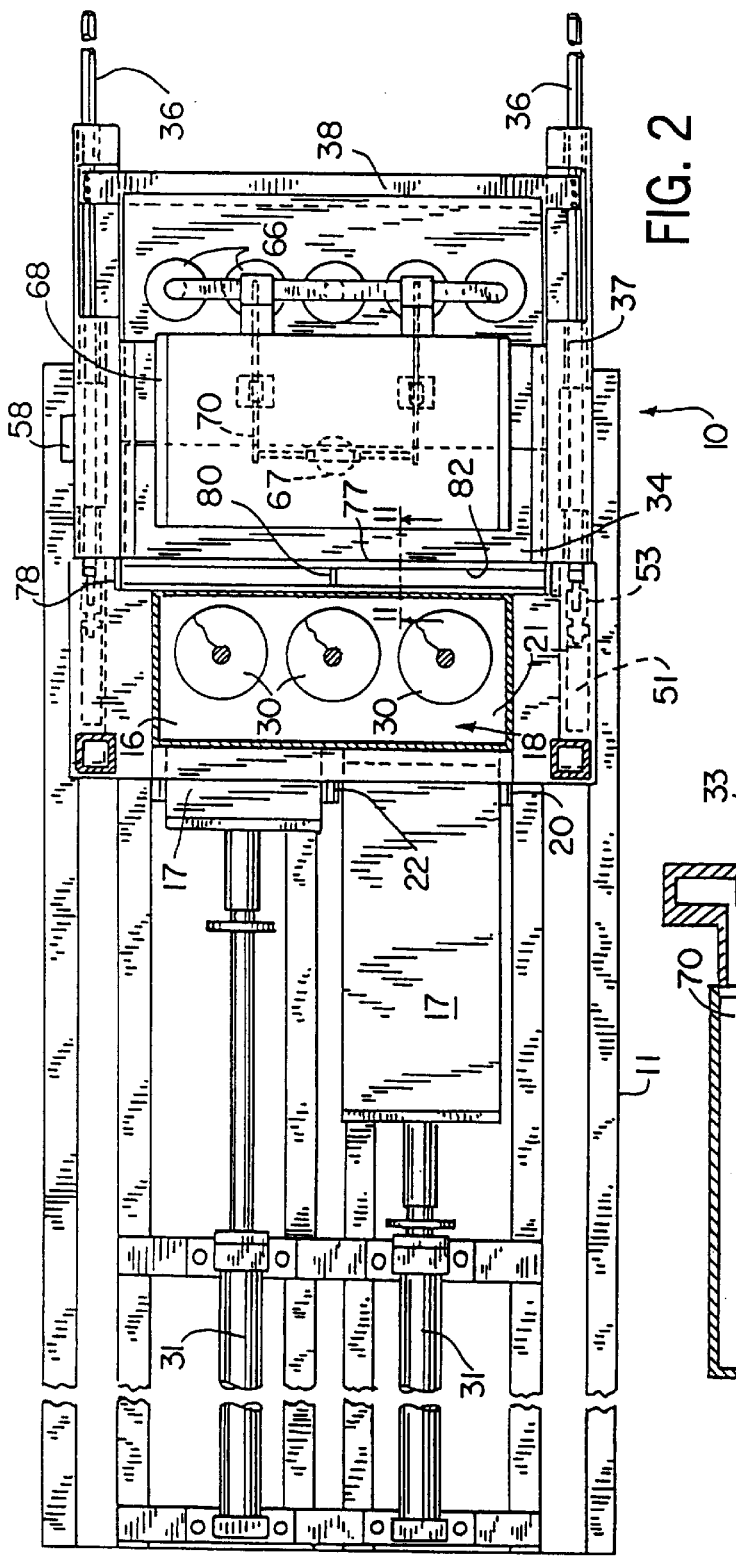
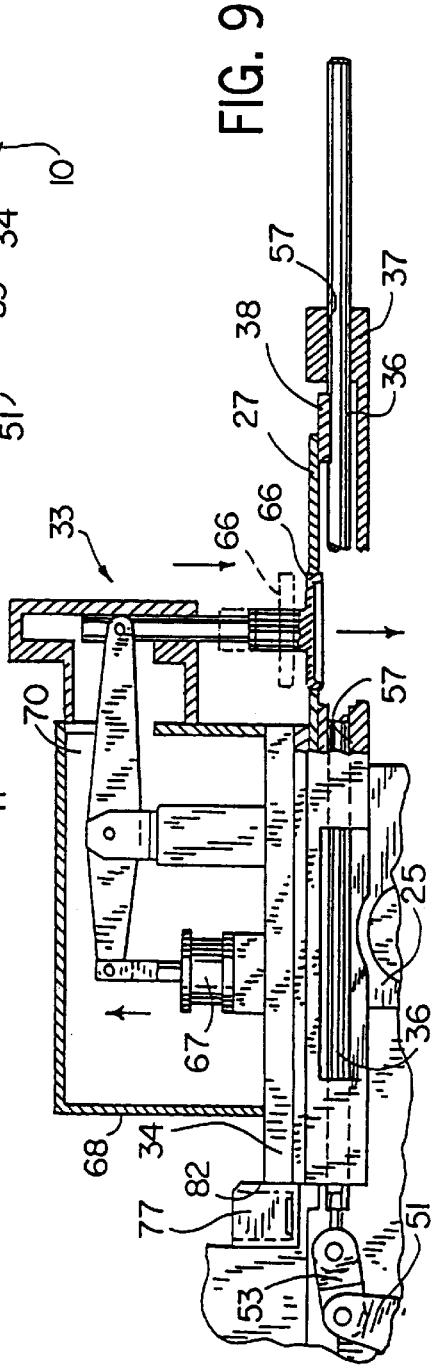
FIG. 2
FIG. 9

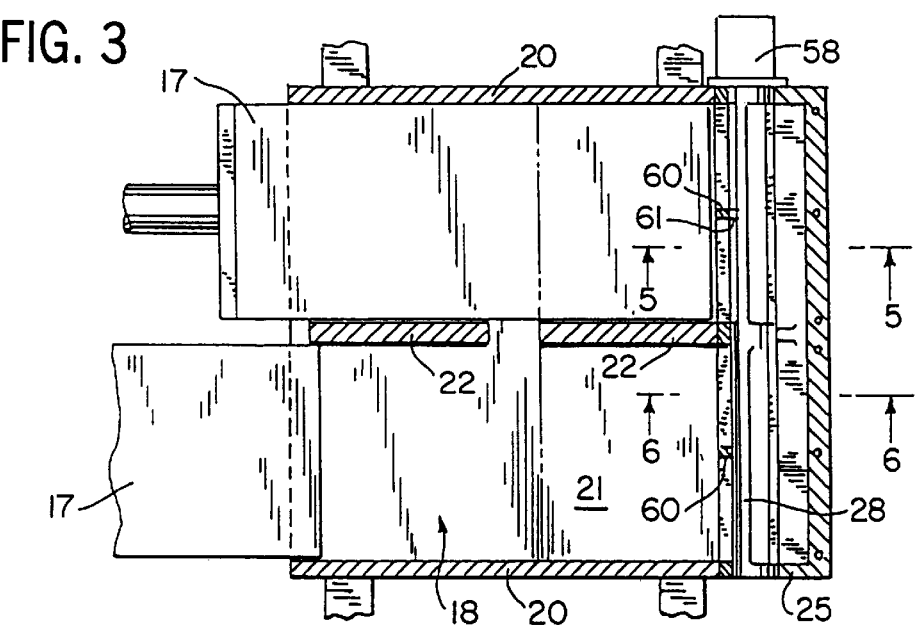
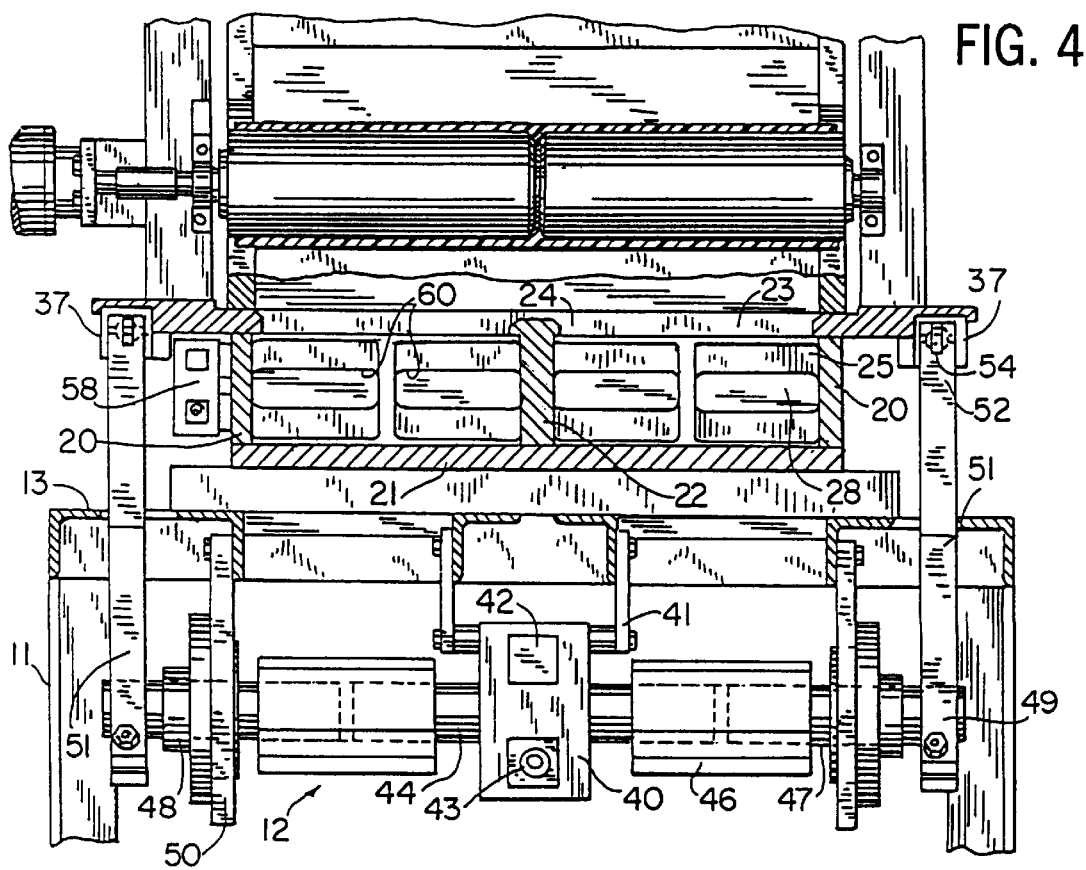

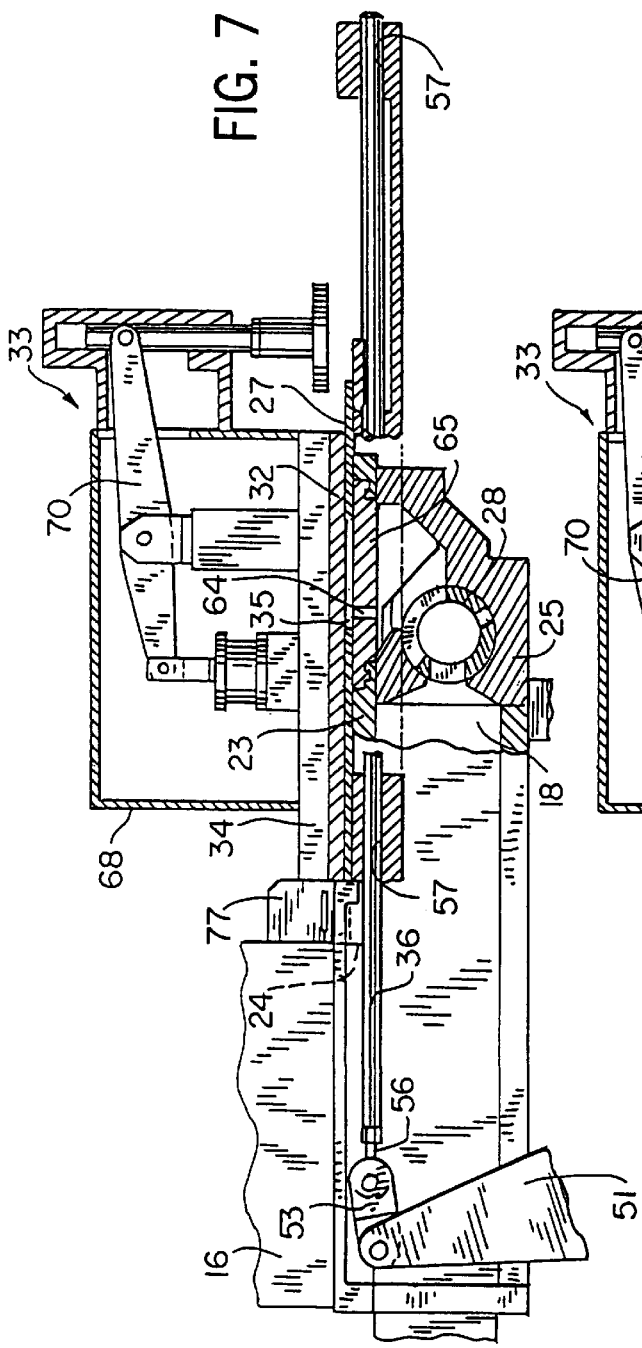
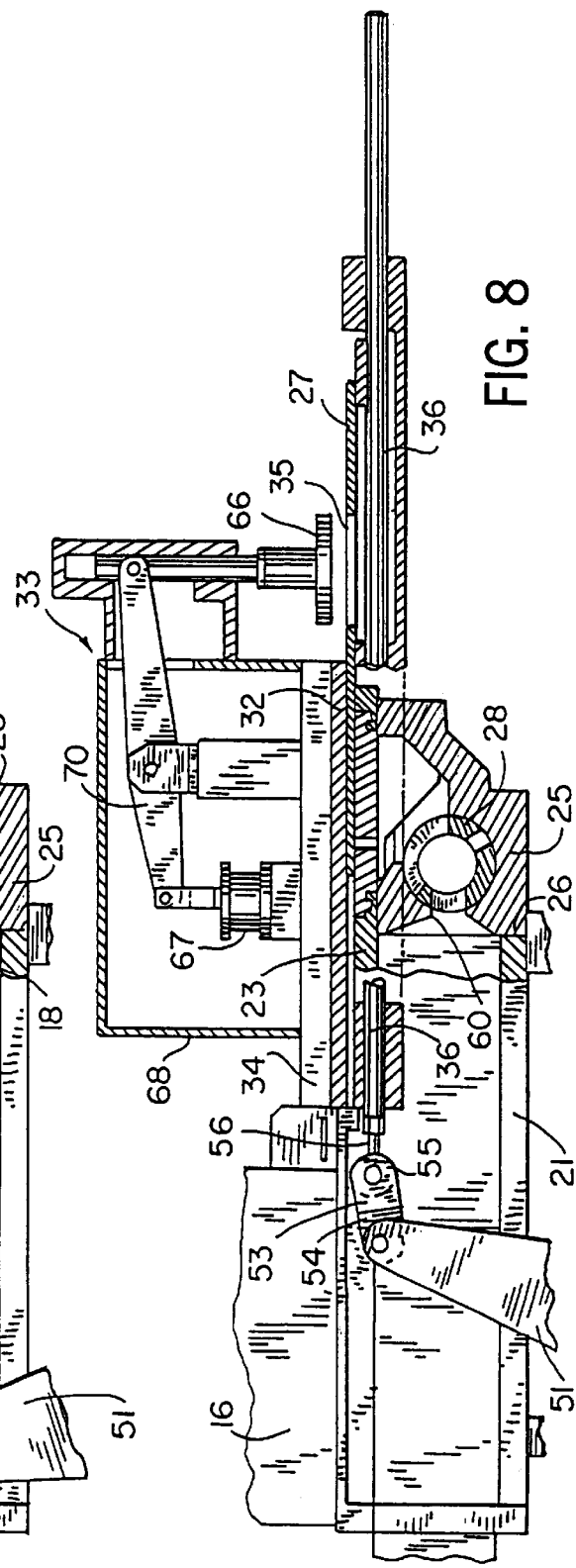

CONTROL OF FOOD PATTY MOLDING MACHINE

BACKGROUND OF THE INVENTION

This is a continuation-in-part of Serial No. 09/047,070 filed Mar. 24, 1998, now U.S. Pat. No. 5,980,228.

The present invention pertains to a hydraulically driven food patty molding machine and, more particularly, to improved speed and pressure release controls for the feed rams in such a machine.

Machines for the high volume production of molded food patties are well known in the art. Such machines are used, for example, to form hamburger patties from a supply of ground beef by forcing the ground beef under pressure from a pair of alternately operable feed rams into a multi-cavity mold plate which is rapidly shuttled on a linear slide between a fill position in which ram pressure forces the food product into the mold cavities and a discharge position in which vertically reciprocable knock-outs push the patties from the mold cavities. U.S. Pat. No. 3,887,964 discloses the construction and operation of a food patty molding machine which is basically unchanged and remains in current use. The machine disclosed in that patent utilizes a variable speed motor-driven reducer which operates a rotary crank mechanism and cooperating mechanical linkage which converts the rotary motion to reciprocable motion to drive the mold plate between its fill and discharge positions. The mechanical linkage includes a hydraulically buffered lost motion mechanism which is utilized to provide a short dwell in each of the mold plate fill and discharge positions. The variable speed drive is also mechanically linked to the knock-outs for discharging the patties from the mold plate in a manner which times operation of the knock-outs directly and mechanically to the reciprocable operation of the mold plate.

A number of disadvantages have been found to be attendant to the construction and operation of the above described food patty molding machine. The mechanical drive linkage includes a significant number of individual components resulting in a rather complex mechanism. An offset connection of the lost motion drive mechanism to the ends of the mold plate carriage results inherently in the imposition of significant laterally directed loads on the carriage slide mechanism. These lateral loads, in turn, have been found to cause substantial rapid wear of the linear drive shafts and supporting linear bearings which comprise the reciprocating carriage. Excessive wear can eventually lead to misalignment beyond the range of attainable adjustment, fracture of mold plates, and other potential damage if not closely monitored. At best, rapid wear of the mold plate carriage linear drives and bearings creates a chronic maintenance and replacement part problem. Also, the lost motion drive which is utilized to provide short dwell periods at the ends of the fill and discharge positions, is not easily adjustable to compensate, for example, for changes in temperature of the supply of ground meat or ground food product. Compensation for changes in the food product itself are also important, but cannot be adequately handled in food product molding machines of the prior art. For example, the differences in molding characteristics between ground beef and whole muscle chicken are significant and the equality of the final molded product may be affected significantly by changes in ram feed speed, fill cycle time, and fill dwell time.

Furthermore, because operation of the mold plate and the knock-outs is linked mechanically, there is no possibility of halting operation of one or the other of the subsystems in the event of a problem, such as misalignment of the mold plate with the knock-out cups in the discharge position. In addition, because of the strict requirements imposed on machinery used in the processing of food for human consumption, the applicable regulations require rigorous cleaning procedures, in particular high pressure washing with water. Prior art machines have not been very tolerant to high pressure washing and, as a result, periodic washing often results in shorted electric motors and other electric components, rust and corrosion, loss of lubricant from grease fittings, all adding considerably to the time and cost of maintenance and repair.

In accordance with U.S. Pat. No. 5,655,436, a patty molding machine of the type utilizing a linearly reciprocable mold plate is provided with a direct rotary actuator drive which provides virtually direct linear transfer of the drive force to the ends of the linear drive shafts supporting the mold plate and the virtual elimination of high wear lateral loads. The rotary actuator is operable to provide variable speed operation and closely controllable positioning in a manner obviating the need for complex lost motion linkages. An encoder directly linked to the output of the rotary actuator is used to control the operation of a completely independently driven knock-out mechanism, obviating the need for a timed mechanical link between the mold plate and the knock-outs.

In accordance with U.S. Pat. No. 5,730,650, controlled operation of the food product molding machine of 5,655,436 is provided by a method which includes the steps of commencing forward movement of the feed ram to feed a food product into the mold plate cavity in response to a fill-on control signal generated during the return stroke, terminating forward movement of the ram and the feeding of food product to the mold cavity in response to a fill-off control signal which is generated during the discharge stroke, holding the mold plate for a discharge dwell time in the discharge position in response to a discharge position signal, and selectively adjusting the discharge dwell time to vary the mold plate cycle time. Adjusting the discharge dwell time may also be responsive to a change in fill dwell time to maintain a constant mold plate cycle time.

In the operation of all of the food patty molding machines described in the foregoing patents, it has been found difficult to compensate and adjust for changes in the flow and molding characteristics of different food products. In addition, it has been found that the high feed pressures generated by the feed rams impose extremely high pressure on the mold plate as it moves from the fill position to the discharge position and back to the fill position. During the processing of a given food product, the temperature or moisture content of the food supply may vary and, as a result, the manner in which the product fills the mold cavities also varies. If a completely different food product is processed, the manner in which it flows from the feed mechanism into the mold cavities may change considerably. In U.S. Pat. No. 3,887,964, ram pressure adjustment is effected with a pressure adjustment of a variable volume pump operating at a set pressure. In addition, an accumulator is used to minimize pressure drop during the mold fill portion of the cycle.

The high ram pressure which causes the pressurized food to impose lateral loads on the mold plate results in extremely high mold plate wear, as well as wear on the surfaces of the slide bearings and other plates in sliding contact with the mold plate. An attempt to reduce the pressure of the food product on the mold plate after the mold cavities have been filled and the plate is moving to the discharge position is described in U.S. Pat. No. 4,356,595. In accordance with the teaching of that patent, the feed ram pressure is reduced during the transition of the mold plate from the fill position to the discharge position and until the plate returns to the fill position. This improvement has helped, but has not eliminated the problems of continuing high loads imposed by the pressurized food product after the mold cavities have been filled. Another problem associated with this high pressure is the tendency of some products, such as ground beef, to form into patties having unacceptable peripheral lips resulting from a smearing of the product during mold plate movement.

SUMMARY OF THE INVENTION

In accordance with the present invention, variations in the manner in which the same food product fills the mold cavities because of variations in temperature, moisture, and the like are eliminated with a unique ram speed control apparatus and method. The apparatus and method also allow speed control variations to accommodate the molding of completely different food products. In addition, a positive ram pressure release system and method eliminate the high wear and product quality problems associated with prior art devices.

In accordance with the method of the present invention, the feed ram in a hydraulically operated food product molding machine, in which the feed ram is driven in a feed direction and in a reverse return direction by a hydraulic actuator (such as a hydraulic cylinder), is controlled in accordance with a method comprising the steps of:

(1) supplying pressurized hydraulic fluid to the actuator with a pump operating at a given pump flow rate to drive the ram in the feed direction in response to a fill signal; and, (2) providing a supplemental source of pressurized hydraulic fluid flow to the actuator operative to drive the ram in the feed direction in response to the fill signal, wherein the response of the supplemental fluid source to the fill signal is faster than the response of the pump to said signal.

Preferably, the method includes the step of controlling the supplemental fluid source to selectively vary the flow rate. In the preferred embodiment, the supplemental source comprises an accumulator and the step of controlling the accumulator comprises the step of placing an adjustable flow control in a flow path between the accumulator and the actuator.

In accordance with the preferred method, pressurized fluid from the pump and from the accumulator share a common flow path to the actuator, and the flow in the common flow path is selectively controlled to direct flow to the actuator for driving the ram in the feed and return directions. Control is effected by the method step of controlling the flow in the common flow path with a directional control valve.

In accordance with another aspect of the method of the present invention, the process also includes the steps of (1) terminating the feed direction flow of pressurized hydraulic fluid and releasing feed direction pressure on the actuator in response to a fill off signal for a time sufficient to release ram pressure on the food product, and (2) redirecting the fluid flow to the actuator to move the ram in the feed direction in response to a subsequent fill signal. Preferably, the step of terminating feed direction flow comprises reversing flow to the actuator to drive the ram in the return direction.

Preferably, the step of terminating feed direction flow to the actuator comprises terminating the flow from the accumulator prior to the fill off signal. The method also includes the step of recharging the accumulator with at least a portion of the pump flow.

In accordance with a variant method of the present invention, the apparatus is controlled in accordance with the steps of (1) supplying pressurized fluid to the actuator at a selectively variable flow rate to drive the ram in the feed direction in response to a fill signal; (2) terminating the feed direction flow and releasing feed direction pressure on the actuator in response to a fill off signal; and (3) redirecting the fluid flow to the actuator to move the ram in the feed direction in response to a subsequent fill signal. The step of supplying pressurized fluid to the actuator may comprise (1) pumping fluid at a given flow rate, and (2) supplementing the pump flow with a simultaneous flow from an accumulator. The method also includes the step of terminating the flow from the accumulator prior to said fill off signal. The step of releasing the fill direction pressure may comprise reversing flow to the actuator to drive the ram in the return direction.

An apparatus for performing the preferred method of the present invention includes a pump operative to supply pressurized fluid to the actuator at a given pump flow rate which is effective to drive the ram in the feed direction in response to a fill signal, an accumulator operative to provide a supplemental source of pressurized fluid flow to the actuator to drive the ram in a feed direction in response to the fill signal, the response of the accumulator to the fill signal being faster than the response of the pump to said signal, and an adjustable flow control to selectively vary the flow rate from the accumulator. Preferably, the pump and the accumulator share a common flow path to the actuator, and control of the flow in the common flow path to the actuator comprises a directional control valve.

BRIEF DESCRIPTION OF THE DRAWINGS

FIG. 2 is a plan view, partly in section, of the apparatus shown in FIG. 1 and taken on line 2—2 thereof.

FIG. 3 is a horizontal section taken on line 3—3 of FIG. 1.

FIG. 4 is a vertical section taken on line 4—4 of FIG. 1.

FIG. 7 is a vertical side sectional view of the mold plate and knock-out portions of the machine in the mold fill position.

FIG. 8 is a vertical side sectional view similar to FIG. 7 showing the mold in the discharge position.

FIG. 9 is a view similar to FIG. 8 showing operation of the discharge knock-out device.

DETAILED DESCRIPTION

Figure 1:
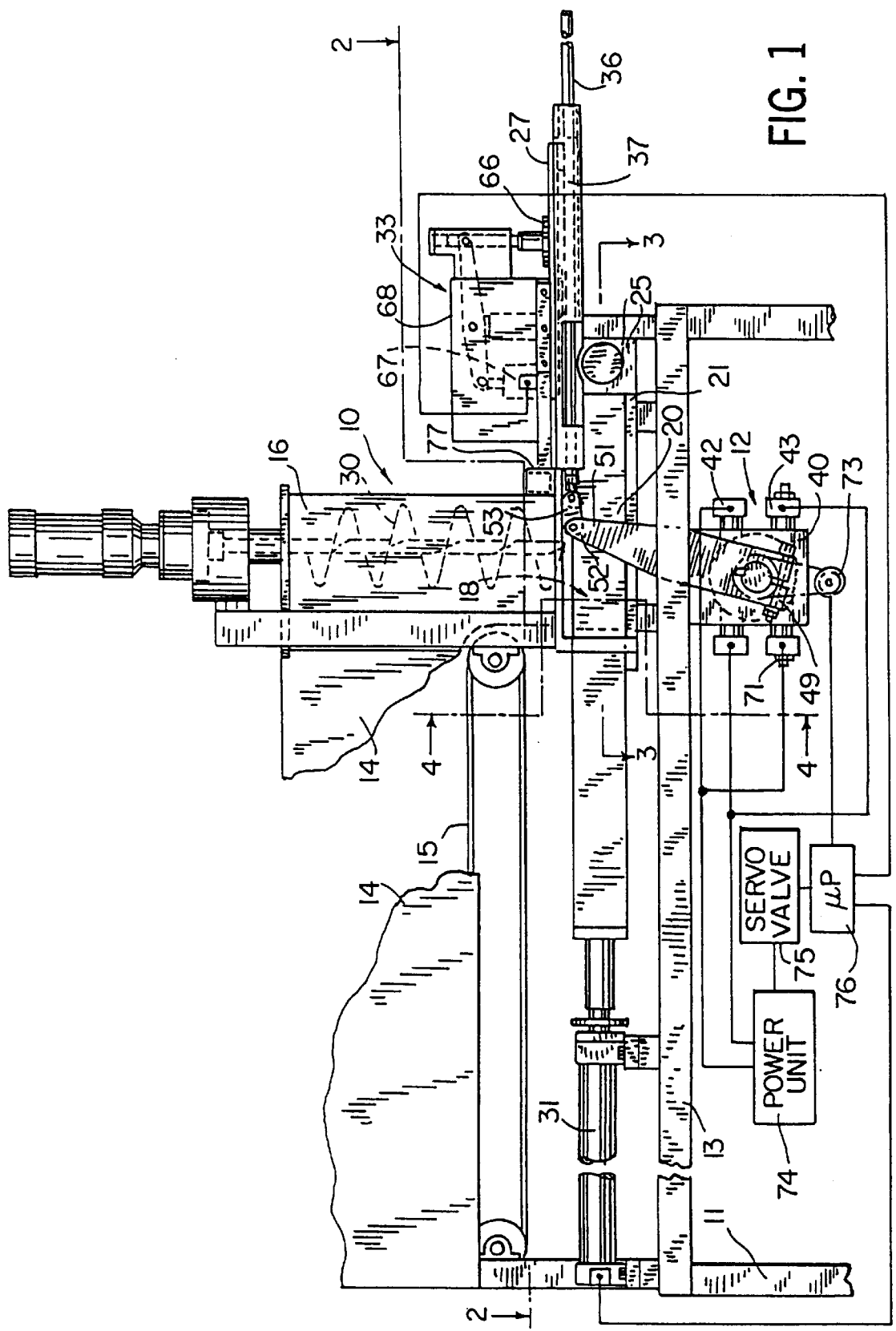
FIG. 1 is a side elevation of the food patty molding machine utilizing the present invention.

Referring initially to FIGS. 1–4, a patty molding machine 10 utilizing the control strategies of the present invention is mounted substantially atop a generally rectangular frame 11, except for the main drive 12 for the patty mold plate, which main drive is mounted to depend downwardly from the upper main frame members 13. The remainder of the interior of the frame provides a housing for the hydraulic power unit, controls and circuitry therefor to be described in greater detail, and the electrical and microprocessor controls.

Ground beef, chicken, or other food product is loaded into a supply hopper 14 where it is moved forwardly by an underlying supply conveyor 15 into a vertically disposed feed hopper 16 at the downstream end of the supply conveyor. Beneath the supply conveyor and extending directly below the bottom of the feed hopper 16 are a pair of laterally disposed horizontally reciprocable feed rams 17. The rams are rectangular in cross section and operate side-by-side in a pair of rectangular shaped feed chambers 18 which lie substantially below the feed hopper 16. The feed chambers are defined by laterally opposite side walls 20, a common bottom plate 21, a common center wall 22, and a common top plate 23 which extends forwardly from a rear edge 24 adjacent the forward edge of the feed hopper 16. Thus, the feed hopper has an open bottom allowing the food product to be fed vertically downwardly into a feed chamber 18 when the ram 17 is withdrawn from the chamber, but which opening is closed as the ram is stroked forwardly through the chamber beneath the feed hopper 16 and then beneath the top plate.

A product distribution manifold 25 is mounted to extend across the machine, beneath the top plate 23 and abutting the downstream end 26 of the bottom plate 21. Thus, the manifold defines the downstream end of the feed chambers 18 and provides an opening for the ground meat or other food product as it is transferred under pressure of one of the rams 17 from the feed chamber to the mold cavities in an upper mold plate 27. A rotary manifold valve 28 operates in the interior of the manifold 25 to direct food product delivered by the ram 17 which is operating in its feed stroke to the mold plate, and to close off the feed chamber 18 for the other ram in the retracted position to allow the feed chamber to be filled from the feed hopper 16. Thus, the feed rams 17 operate alternately, as shown in the drawings, but are fed by the common feed hopper 16. The hopper includes three vertically driven feed augers 30 which, in a manner known in the prior art, are driven by separate motors 29 and operated in pairs to deliver food product to the feed chambers. The center feed auger 30 and the adjacent auger are operated to fill the chamber from which the ram is withdrawn, while the opposite auger, above the ram moving in its feed stroke, is inoperative. Each of the rams 17 is independently driven by a hydraulically driven ram cylinder 31 mounted on the upper frame members 13 below the supply hopper 14. A method and apparatus for control of the ram cylinder is the particular subject of the present invention.

The top plate 23 which defines the top wall of the downstream ends of feed chambers 18, also overlies the manifold 25 and supports the mold plate 27 which slides reciprocally over the top plate between a fill position above the manifold 25 (see FIG. 7) and a discharge position in which most of the mold plate is extended substantially beyond the top plate 23 and manifold 25 (see FIGS. 8 and 9). The top of the mold plate 27 in the fill position is covered by a breather plate 32, allowing air to escape during mold plate filling, and the entire mold station is overlain by the housing for a knock-out device 30 which is supported on a cover plate 34. The cover plate and the entire knock-out device 33 supported thereon are mounted on a lift system (not shown) by which the cover plate may be raised to permit access to the molding station, as for mold plate change, maintenance and cleaning, or the like.

The mold plate 27 is of a conventional construction and comprises a thin rectangular plate with a series of laterally aligned circular openings defining mold cavities 35 in which the ground meat or other food product patties are formed.

The mold plate is attached to and carried between its fill and discharge positions on a pair of laterally spaced linear drive shafts 36. The drive shafts are of circular cross section and each linear drive shaft is mounted for sliding reciprocal motion in a shuttle bar 37 mounted to the side edge of the top plate 23. The linear drive shafts 36 are connected by a laterally disposed draw bar 28. The downstream edge of the mold plate 27 is bolted or otherwise demountably attached to the draw bar 38 to support the mold plate for reciprocal motion with the drive shafts 36. An upstream portion of the mold plate is always retained between the top plate 23 and the breather plate 32 as it shuttles between the fill and discharge positions.

It should be noted that a single feed stroke of a feed ram 17 will provide enough product for many mold plate cycles. Thus, referring to FIG. 2, the upper ram 17 is shown near the end of its feed stroke, during which the mold plate cavities 35 (of which there are five in this example) will have been filled, shuttled to the downstream discharge position where the knock-out device 33 moves vertically to push the patties from the mold cavities, and recycled through the fill-discharge cycle as many as 15 to 20 times during one feed stroke of the ram.

The linear drive shafts 36 which carry the reciprocal mold plate 27 are driven by a rotary actuator 40 in a manner which provides virtually direct linear transfer of the rotary driving force from the actuator to the ends of the linear drive shafts, resulting in the virtual elimination of high wear lateral loads typical of prior art devices. The rotary actuator 40 is attached to the underside of the upper main frame members 13 with a mounting bracket 41. The rotary actuator shown is of the two cylinder type in which upper and lower actuator cylinders 42 and 43 are mounted and operated to stroke simultaneously in opposite directions to provide reciprocal rotary movement to a main driving shaft 44 mounted to extend laterally through the actuator between the cylinders 42 and 43. In a manner well known in the art, the operating pistons of the actuator cylinders are toothed racks 45 and the driving shaft 44 includes a pinion (not shown) mounted on the center of the shaft 44 and captured between the opposed toothed racks 45. The actuator may be supplied by a suitably controlled supply of hydraulic pressure to alternately stroke the actuator cylinders 42 and 43 in opposite directions to provide the desired reciprocating rotary motion to the main driving shaft 44. Each end of the driving shaft 44 is connected with a suitable coupling 46 to an axially aligned stub shaft 47 rotatably supported in a bearing 48. Each of the bearings 48 is, in turn, mounted on a bearing support plate 50 attached to the upper main frame 13.

A main mold plate drive arm 51 is clamped by a drive end 49 to the outer end of each stub shaft 47 for reciprocal rotation therewith. The drive arms 51 extend upwardly to driven ends 52, each of which is connected to the end of one of the linear drive shafts 36. The driven ends 52 of the drive arms necessarily operate in a circular arc, but the significant length of the drive arms and the relatively small rotational arc through with the arms rotate result in the driven ends 52 traveling through a short shallow arc which does not depart significantly from the horizontal plane of the linear drive shafts 36. In other words, the driven end 52 of the drive arm, through the full range of its reciprocal rotation, remains substantially on the axis of the linear drive shaft 36 to which it is attached. However, this small amount of rotational movement requires each connection to be made with a short drive link 53. Each drive link has a flat end 54 which is pinned in a clevis formed in the driven end 52 of the drive arm and a clevis end 55 which is connected to the free end of the linear drive shaft 36, such as with a rod end bearing 56.

Full stroke of the mold plate from its fill position (FIG. 7) to its discharge position (FIG. 8) requires only 30° of rotation by the rotary actuator 40 and thus 30° rotation of the drive arms 51. In the extreme positions of fill and discharge, the drive links 53 are only angled about 7.5° downwardly from the horizontal and thus rotate with respect to their pinned connections to the driven ends 52 of the drive arms through a total arc of only about 15°. The actuator is positioned midway between the extremes of drive arm rotation and the drive arms are positioned to sweep a shallow arc which carries the upper driven ends above the horizontal plane of the axes of the linear shafts 36. Thus, at the top dead center position of the drive arms, the driven ends of the arms (and the ends 54 of the drive links connected thereto) are above the plane of the linear shafts. In this position, the drive links are angled upwardly from the horizontal by about the same 7.5°. In the two mid-positions between drive arm top dead center and the fill and discharge positions, the drive links are horizontal and each driven end 52 of a drive arm lies directly on the axis of the linear shaft 36 to which it is connected. As a result, the mold plate driving force is always imposed nearly linearly on the linear drive shafts, resulting in a very minor, if any, lateral force component tending to lift up or pull down on the drive shaft ends, depending on the direction of motion and drive arm position. This arrangement causes far less wear on bearing surfaces 57 in the shuttle bars 37 through which the linear drive shafts reciprocate. Also very important is the minimization of transfer of vertical loads imposed on the ends of the linear drive shafts downstream to the points where the draw bar 38 and mold plate 27 are connected. As may be seen in the mold plate in FIG. 2, the relatively large mold cavities 35 result in fairly small web sections in the mold plate between the cavities. Vertical up and down loads imposed on the linear drive shaft ends because of the non-linear drive linkages typical of prior art machines often result in fracture of the mold plate.

The rotary actuator 40 may be replaced by another type of actuator to drive the linear drive shafts and the mold plate 27 attached thereto. For example, a double acting hydraulic cylinder may be attached to the main driving shaft 44 with a short crank arm and stroked back and forth to provide the reciprocal rotary motion to the mold plate drive arms 51. The control and operation of the alternate double acting drive cylinder is otherwise identical to the rotary actuator 40 shown in the drawings.

Figure 5:
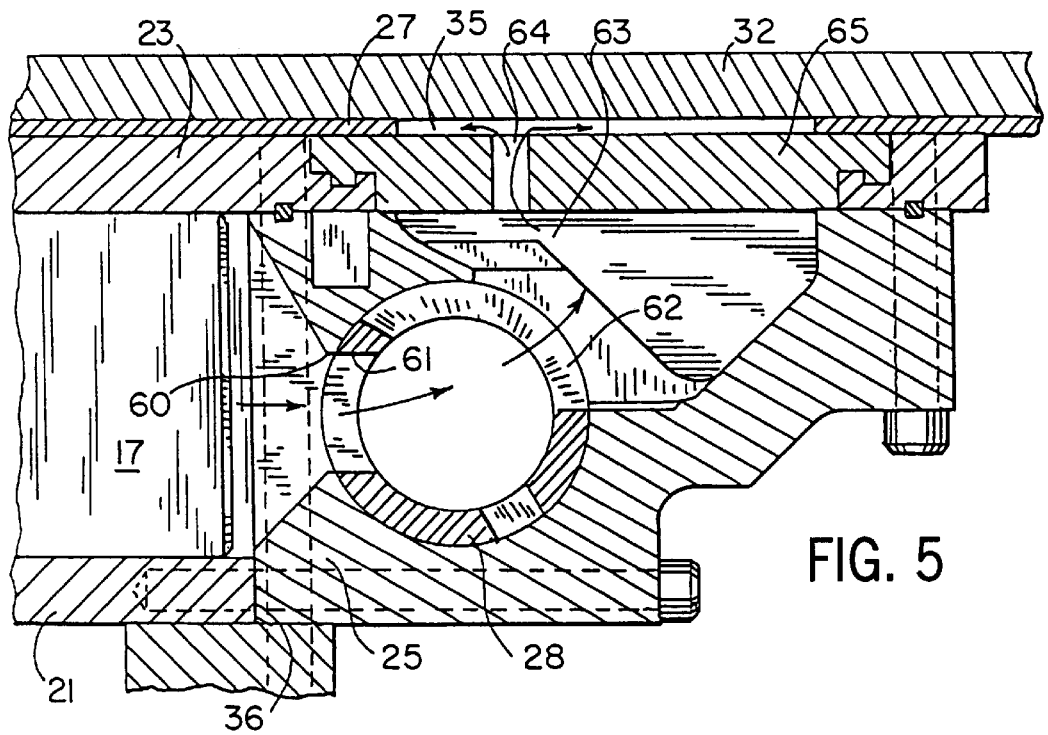
FIGS. 5 and 6 are enlarged sectional details taken on lines 5—5 and 6—6, respectively, of FIG. 3.
Figure 6:
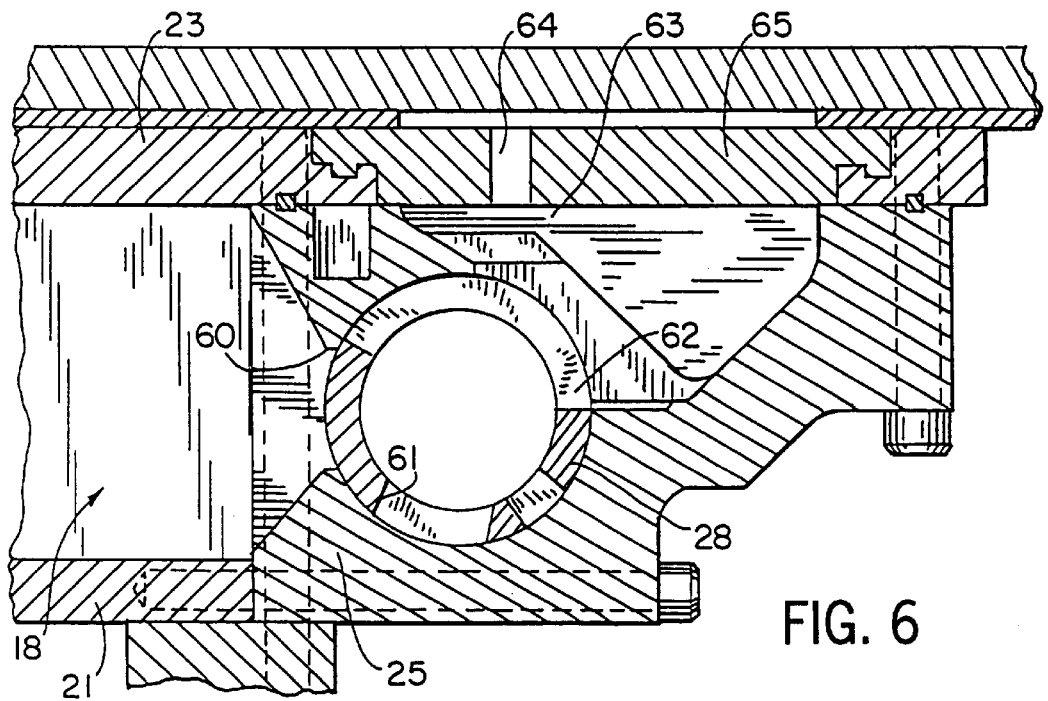

The manifold valve 28 is basically a ported cylindrical sleeve which operates with a reciprocal rotational movement inside the manifold 25. The manifold valve 28 is operated with a small rotary actuator 58 mounted on one of the upper side frame members 13 and having a direct axial driving connection to the valve 28. The actuator 58 may be identical to rotary actuator 40, except that it is of a much smaller size. The small rotary actuator 58 and thus the manifold valve 28 are driven in timed relation to the cyclic reciprocation of the feed rams 17. Referring particularly to FIGS. 4–6, the manifold valve 28 is positioned to uncover and open a pair of feed slots 60 at the end of the feed chamber 18 carrying the ram which is being stroked in the feed direction. That orientation of the manifold valve 28 automatically closes the feed slots 60 in the feed chamber for the other ram 17 which has been withdrawn or is being withdrawn to refill its feed chamber. The manifold valve 28 is provided with two pairs of feed passages 61 of a size and shape to correspond to the feed slots 60, but with the pair of feed passages for one of the feed chambers displaced circumferentially around the cylindrical manifold valve so the valve covers and closes the feed slots in the chamber from which product is not being fed. The circumferentially opposite side of the manifold valve has a full length transfer passage 62 which extends circumferentially around the valve far enough so that it remains open to permit passage of the food product upwardly and out of the manifold regardless of which feed passages 61 are being utilized. From the transfer passage 62, the product passes through an upper outlet passage 63 in the manifold 25 and vertically upward through a fill slot 64 in the top plate 23 which overlies the manifold. Actually, the fill slot is formed in an insert plate 65 placed in a suitable opening in the top plate 23. This permits exchange of fill slots to accommodate different products, different mold plates, and the like. As may be seen best in FIGS. 5 and 6, ground meat or other food product passing through the fill slot 64 moves directly into the mold cavities 35 which overlie the fill slot when the mold plate is in the retracted fill position.

The filled mold plate is slid forward to the discharge position (FIGS. 8 and 9) where a ganged array of knock-out cups 66 is moved downwardly simultaneously to push the molded food patties downwardly out of the mold cavities. The knock-out device 33 includes a short stroke knock-out cylinder 67 mounted within the upper housing 68 and operable to move one end of a lever arm assembly 70, the opposite end of which carries ganged knock-out cups 66. The knock-out device is driven completely independently of the mold plate drive, with its operation timed with respect to the mold plate drive by signals generated from the drive in a manner which will be described.

With the feed ram 17 moving forwardly in its feed stroke (such as the ram 17 shown uppermost in FIGS. 2 and 3), the manifold valve 28 is positioned as shown in FIG. 5 to allow the meat product to pass through the manifold feed slots 60 in the manifold, the aligned feed passages 61 in the valve, through the interior thereof, and upwardly through the transfer passage 62, outlet passage 63 and fill slot 64, and into the mold cavities 35, all as previously described. While the mold plate is in the fill position, it may be held there for a short dwell period to accommodate filling. In the fill portion of the molding cycle, movement of food product through the fill slot 64 and into the mold cavities 35 will typically commence as soon as the mold cavities come into communication with the fill slot upon return of the mold plate 27 from the discharge position. Similarly, movement of the food product through the fill slot and into the mold cavities will continue as the mold plate moves from the fill position toward the discharge position, so long as product flow communication is maintained (in other words, until the portion of the mold plate 27 upstream of the mold cavities passes over and closes off the fill slot 64). Utilizing a rotary actuator 40 for the main mold plate drive, the dwell may be provided by simply halting rotary motion of the actuator for the desired dwell period. This eliminates the need to utilize complex hydromechanical lost motion devices typical of the prior art. When the rotary actuator is again operated to move the mold plate to the discharge position, another short dwell period is provided while the knock-out cylinder 67 is actuated to operate the knock-outs 66 which pass vertically downwardly through the mold cavities 35 in the mold plate, as shown in FIG. 9.

There may be only 0.1 inch (2.5 mm) total clearance between the knock-out cups 66 and the side walls of the mold cavities 35. Therefore, it will be understood that extremely accurate positioning of the mold plate in the discharge position is required. Precise positioning of the mold plate in the discharge position is easily accommodated with control signals generated by an encoder 73 mounted to be driven by the rotary actuator drive, as will be described hereinafter.

In the operation of prior art devices, when the mold plate is moving to the discharge position and the fill slot 64 in the top plate is covered and closed by the solid portion of the mold plate 27, there will be a pressure build up in the ram cylinder 31 which continues to advance in its feed stroke. In the prior art, a pressure responsive device on the cylinder senses the increase in pressure and halts the advance of the ram until the mold plate has returned or is returning to the fill position at which time the ram may be actuated by a sensed pressure decrease to continue to advance in the feed stroke. As is also typical of prior art devices, operation of the knock-out device is timed by a direct mechanical link to the main mold plate drive. With this mechanical link, inaccurate positioning of the mold plate in the discharge position, resulting for example from wear in the drive linkage, may result in catastrophic contact between the knockouts and the mold plate.

In the molding machine described herein, overpressure sensing control of the feed strokes of ram cylinders 31 and mechanically linked timed operation of the knock-outs are both eliminated. An encoder 73 is directly connected to the main driving shaft 44 to operate directly in response to reciprocal rotation thereof to generate control signals which are very accurately representative of the mold plate position at and between the fill and discharge positions. These signals may then be utilized to provide accurate timed operation of the feed stroke movement of the rams and the operation of the knock-out device. For example, to enhance cycle speed and efficiency, an encoder signal may be utilized on the return stroke of the mold plate from the discharge to the fill position to generate a fill-on signal as the mold cavities approach the fill slot to reactivate the ram to advance. The ram continues to advance while the mold plate returns to the fill position, is held there for a short dwell period and begins reverse movement toward the discharge position. When the mold plate reaches a selected fill-off position, an encoder signal is processed to deactivate the ram once again. Similarly, encoder signals may be utilized to activate knock-outs only when the mold plate is in the discharge position.

Position sensors on the knock-out device 33 are also utilized to prevent operation of the mold plate in the event the knock-outs are misaligned or not operating properly. The knock-out cylinder 67 is operable in response to an encoder signal to stroke the knock-outs only when the mold plate is in the discharge position. Appropriate proximity sensors detect the down position of the knock-outs, assuring they have stroked properly, and allow them to retract. The up position of the knock-outs is independently detected to confirm they have been properly retracted before the mold plate can be stroked back to the fill position. This separate independent operation of the mold plate and knock-out device avoids the potential problems of prior art devices which are mechanically linked and forced to cycle together, even in situations of potentially catastrophic misalignment.

Referring again to FIG. 1, there is shown a basic schematic of use of the encoder signals to operate the system power unit to provide a controlled supply of hydraulic fluid for various operating subsystems of the machine. The power unit 74 includes the usual motor-driven hydraulic pump, associated control valves, fluid supply and return lines, and reservoir, all as is well known in the art. Direct control of the power unit is accomplished via a hydraulic servo valve 75 which receives signals from the encoder 73 with the signals suitably processed by an intermediate microprocessor 76. For example, encoder signals representative of the fill and discharge positions of the mold plate provide the basis for precisely determining the mold plate position anywhere in between and during plate movement in either direction. These encoder signals can then be processed by the microprocessor 76 to, for example, actuate the ram cylinder 31 at any selected position of the mold plate in the return stroke, set the dwell time of the mold plate in the fill position, shutoff the cylinder and associated feed ram 17 at any selected position in the mold plate discharge stroke, and provide a discharge position signal allowing the knockout device 33 to be actuated.

The rotary actuator 40 is preferably operated to provide uniform acceleration and deceleration in both the return stroke and the discharge stroke, and to operate both strokes at the same speed. Cycle time may be conveniently and simply varied by adjusting the dwell time in the discharge position. In this manner, the fill portion of the cycle is totally unaffected which is extremely important in maintaining the uniformity of the molded food product. In the practical operation of a molded food processing plant, factors both upstream and downstream of the patty molding machine may require or make it desirable to operate the machine at a slower or faster speed. For example, if the supply of meat to the hopper 14 is interrupted or slowed, the machine cycle time may need to be correspondingly slowed to avoid exhaustion of the food supply. Similarly, downstream interruptions in equipment or processes for handling the formed food patties may make it necessary or desirable to temporarily slow the cycle time of the machine. In prior art machines, slowing the cycle time caused a uniform slowing of the entire cycle, including the fill portions of the return and discharge strokes. However, corresponding adjustment of the fill-on and fill-off positions could not be effected and, as a result, the consistency and/or quality of the molded food products varied.

It may also be necessary or desirable to adjust the fill portion of the cycle and to do so without changing the cycle time. For example, a significant change in the temperature of the food product being supplied to the machine will have a significant effect on how the product molds. If the temperature of the food product supply drops significantly, it may be necessary to adjust the timing of the fill-on or fill-off signals or to increase the fill position dwell time. A change in the latter would normally cause a change in cycle time. However, with the present machine, any change in the fill position dwell time can be compensated with an identical, but opposite change in the discharge dwell time and, as a result, the cycle time remains unchanged.

With the use of a programmable controller in the microprocessor 76, it is possible to establish parameters for optimum molding of a particular food product based on its known content, supply temperature, and other factors, and to program the optimum fill-on, fill dwell, and fill-off times in the microprocessor controller. The machine may then be operated at any desired speed by appropriate adjustment of the discharge dwell time (within the range of available cycle times) without altering the critical mold fill portion of the cycle.

As indicated previously, the feed chambers 18 and length of stroke of each of the rams 17 is designed to provide multiple mold plate fill cycles per ram feed stroke. In the prior art the end of the ram feed stroke is sensed by an appropriate limit switch or proximity sensor and the signal generated is used to begin feed stroke movement of the other ram 17 and to halt and reverse the ram which has reached the end of its feed stroke. However, if the mold plate is being filled when feed is shifted from one ram to another, an intermittent halt in product flow may result in the mold cavities 35 being only partially filled and, of course, defective molded food products. However, in the present machine, the encoder keeps accurate track of the exact position of the mold plate and, if the encoder signals indicate that the mold plate is anywhere between the fill-on and fill-off positions, the manifold valve 28 will not be rotated and the other ram will not begin its feed stroke until the fill portion of the cycle has been completed, in other words, until a fill-off signal from the encoder has been processed.

Figure 10:
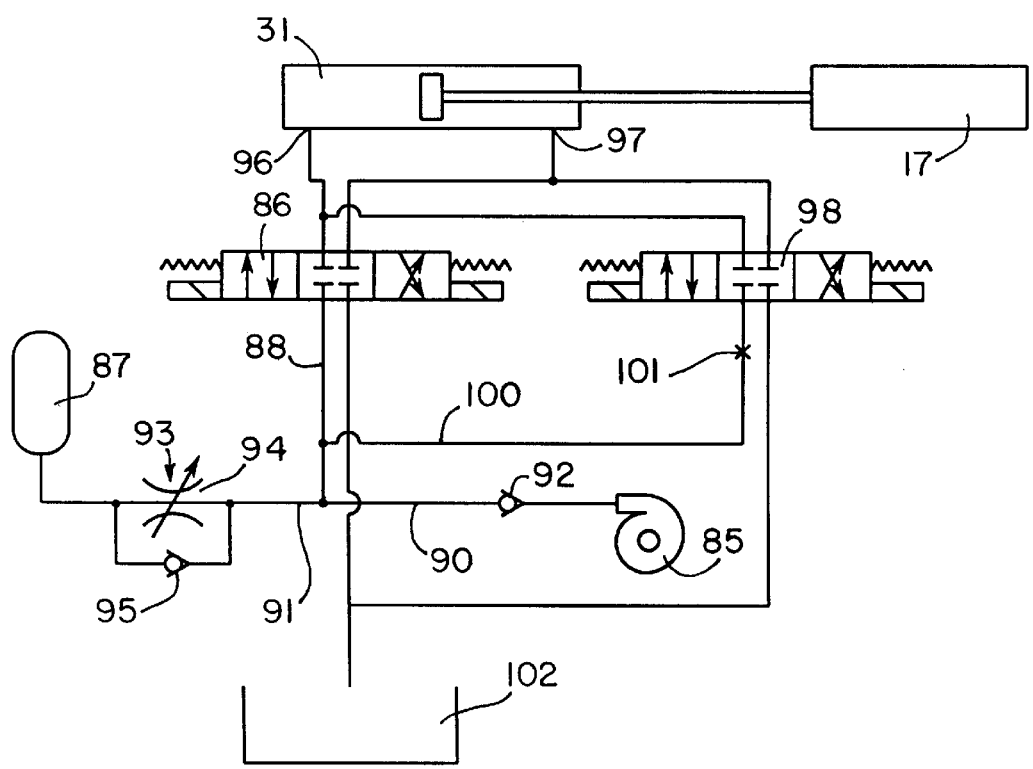
FIG. 10 is a schematic of the hydraulic supply and control circuit for controlling the feed rams of the food patty molding machine.

In accordance with the method and apparatus of the present invention, it has been found that the speed of the feed ram 17, particularly as it resumes forward movement in response to a fill-on signal, has a significant effect on movement of the food product into the mold plate cavities 35 and, therefore, on the quality and consistency of the molded food patty. Referring to the schematic hydraulic supply and control circuit of FIG. 10, each of the cylinders 31, providing the reciprocal linear movement to a feed ram 17, receives its primary supply of pressurized hydraulic fluid from a hydraulic pump 85 comprising a part of power unit 74. The pump 85 is preferably a variable volume pump and, during machine operation, runs continuously. The control of hydraulic fluid to each of the ram cylinders 31 is provided by a four-way directional control valve 86 of a conventional construction and only one of which is shown in FIG. 10. An accumulator 87 is also connected in the system to supply pressurized hydraulic fluid, along with pump 85, to the directional control valve 86 via a common flow path 88. Thus, a supply line 90 from the pump 85 and a supply line 91 from the accumulator 87 join the common flow path 88 to the valve 86. The pump supply line 90 includes a check valve 92 to prevent back flow to the pump from the accumulator. The accumulator supply line 91 is provided with a variable flow control 93 which includes an adjustable flow control valve 94 and a check valve 95 connected in parallel with the adjustable flow control valve.

In response to a fill-on signal from the microprocessor 76, the spool of the directional control valve 86 is moved to the left hand position (FIG. 10) to direct pressurized fluid to the head end 96 of the ram cylinder 31, causing extension of the piston rod and forward movement of the ram 17. However, the response of the pump 85 to the fill-on signal results in a slight delay in pressurization of the cylinder 31 and corresponding movement of the ram 17. It has been found that speeding the pressure response to the cylinder 31 has a dramatic effect on the quality of the product being molded, as well as the quality of the patties when the food product is changed. For example, temperature and moisture content may significantly affect the molding characteristics of a particular product. Also, when changing from one product to another, such as from ground beef to whole muscle chicken, the molding characteristics are vastly changed and ram speed has an extremely significant effect on patty quality.

The accumulator 87 has a much faster response to the fill-on signal and provides an immediate supply of pressure to the head end 96 of the cylinder. The initial surge from the accumulator fills the time lag in the response of the pump 85 to the fill-on signal, which time lag may be approximately 50 microseconds. In addition, the adjustable flow control valve 94 may be utilized to vary the initial speed of response provided by accumulator discharge. For example, the quality of ground beef patties is improved by increasing the ram speed, whereas chicken has been found to mold better at slower speeds. The variable flow control 93 may also be utilized to adjust for variations in product consistency as, for example, resulting from moisture or temperature variations. The accumulator 87 discharges and loses pressure quite rapidly, but the response of the pump 85 immediately takes over to maintain the supply of pressurized fluid. Simultaneously, the pump recharges the accumulator via the by-pass line containing the check valve 95. The pressure drop across the flow control valve 94, even at full open, is higher than the drop across the check valve 95, thereby allowing simultaneous recharge of the accumulator 87.

As indicated previously, a single feed stroke of the ram 17 provides enough food product for many mold plate cycles. Thus, full retraction of the ram 17 takes place when the associated feed chamber 18 has been depleted.

It has also been found that positive pressure release on the ram cylinder 31 and associated plunger 17 at the end of each mold plate fill cycle also has a significant effect on the quality of the molded food patty and, also significantly, on the wear imposed on the mold plate and other components against which it slides. Prior art machines have utilized a temporary pressure relief feature, lowering somewhat the full fill pressure exerted by the ram 17 during the discharge portion of the mold plate cycle. Although this has helped reduce high wear of the mold plate, particularly as a result of food pressure pushing it against the overlying breather plate 32, high wear of the mold plate, breather plate and other sliding components remains a problem. In addition, the pressurized food product feed into the mold cavities 35 (see FIG. 5), if not relieved, may result in an expansion and smearing of the product as the mold plate moves to the discharge position.

In accordance with another aspect of the present invention, a fill-off signal is utilized to provide full release of pressure in the head end 96 of the ram cylinder 31 to thereby provide a full release of pressure on the food product. One manner of providing the pressure release is to actuate the directional control valve 86 to move it to the right hand position to positively reverse the flow to the rod end 97 of the ram cylinder and reverse or retract the cylinder by a very slight amount, for example, 0.010–0.020 inch and for a very brief period of time (e.g. 40 to 150 ms). The generation of a subsequent fill-on signal causes the spool of the control valve 86 to move to the position allowing forward flow to the head end 96 of the cylinder, as previously described.

It is also possible to provide end of fill pressure release by fully relieving the pressure to the rod end 97 of the ram cylinder 31. A directional control relief valve 98 is inserted in the supply lines to ram cylinder 31 in parallel with the main directional control valve 86. As shown in FIG. 10, the directional control relief valve 98 may be of identical construction to main control valve 86. In response to the sensed position of the mold plate 27 at the end of a fill cycle, main control valve 86 is shifted to the center position. Simultaneously, the relief valve 98 is shifted to the left hand position. However, the pressure line 100 to relief valve 98 is blocked at 101, and the pressure in the rod end 97 of the cylinder 31 is relieved directly to tank or reservoir 102. Pressure relief is maintained only for a very short period, e.g. 30 ms or slightly longer, but this has been found to be adequate to eliminate the problems in prior art systems discussed above.

What is claimed is:

1. A method for controlling the feed ram in a hydraulically operated food product molding machine wherein the feed ram is driven in a feed direction and in a reverse return direction by a hydraulic actuator, said method comprising the steps of:

(1) supplying pressurized fluid to the actuator from a pump at a given pump flow rate to drive the ram in the feed direction in response to a fill signal; and, (2) providing a supplemental source of pressurized fluid flow to the actuator operative to drive the ram in the feed direction in response to said fill signal, the response of said supplemental source to said fill signal being faster than the response of the pump to said signal.

2. The method as set forth in claim 1 including the step of controlling the supplemental source to selectively vary the flow rate.

3. The method as set forth in claim 2 wherein said supplemental source comprises an accumulator and the controlling step comprises placing an adjustable flow control in a flow path between said accumulator and the actuator.

4. The method as set forth in claim 3 including the steps of:
   (1) providing a common flow path for pressurized fluid from said pump and said accumulator to the actuator; and,
   (2) controlling the flow in the common flow path to selectively direct said flow to the actuator for driving the ram in the feed and return directions.

5. The method as set forth in claim 4 wherein the step of controlling the flow in the common flow path comprises utilizing a directional control valve in said common path.

6. The method as set forth in claim 1 comprising the steps of:
   (1) terminating feed direction flow and releasing feed direction pressure on the actuator in response to a fill off signal for a time sufficient to release ram pressure on the food product; and,
   (2) redirecting the fluid flow to the actuator to move the ram in the feed direction in response to a subsequent fill signal.

7. The method as set forth in claim 6 wherein said terminating step comprises reversing flow to the actuator to drive the ram in the return direction.

8. The method as set forth in claim 4 including the steps of:
   (1) terminating feed direction flow and releasing feed direction pressure on the actuator in response to a fill off signal for a time sufficient to release ram pressure on the food product; and,
   (2) terminating the pressurized flow from the accumulator prior to said fill off signal.

9. The method as set forth in claim 8 including the step of recharging the accumulator with at least a portion of the pump flow.

10. A method for controlling the feed ram in a hydraulically operated food product molding machine wherein the feed ram is driven in a feed direction and in a reverse return direction by a hydraulic actuator, said method comprising the steps of:
    (1) supplying pressurized fluid to the actuator at a selectively variable flow rate to drive the ram in the feed direction in response to a fill signal;
    (2) terminating feed direction flow and releasing feed direction pressure on the actuator in response to a fill off signal for a time sufficient to release ram pressure on the food product; and,
    (3) redirecting the fluid flow to the actuator to move the ram in the feed direction in response to a subsequent fill signal.

11. The method as set forth in claim 10 wherein said supplying step comprises:
    (1) pumping fluid at a given flow rate; and,
    (2) supplementing the pumped flow with a simultaneous flow from an accumulator.

12. The method as set forth in claim 11 including the step of terminating the flow from the accumulator prior to said fill off signal.

13. The method as set forth in claim 10 wherein the step of releasing fill direction pressure comprises reversing flow to the actuator to drive the ram in the return direction.

14. An apparatus for controlling the feed ram in a hydraulically operated food product molding machine wherein the feed ram is driven in a feed direction and in a reverse return direction by a hydraulic actuator, the apparatus comprising:
    a pump operative to supply pressurized fluid to the actuator at a given pump flow rate to drive the ram in the feed direction in response to a fill signal;
    an accumulator operative to provide a supplemental source of pressurized fluid flow to the actuator to drive the ram in the feed direction in response to said fill signal, the response of said accumulator to said fill signal being faster than the response of the pump to said signal; and,
    an adjustable flow control controlling the supplemental source of a pressurized fluid to selectively vary the flow rate from the accumulator.

15. The apparatus as set forth in claim 14 including a common flow path for pressurized fluid from said pump and said accumulator, and a directional control valve controlling the flow in said common path to selectively direct the flow to the actuator for driving the ram in the feed and return directions.

\* \* \* \* \*